(12) United States Patent
Sherman, II et al.

(10) Patent No.: US 6,234,281 B1
(45) Date of Patent: May 22, 2001

(54) ATTACHMENT OF A BRAKE CABLE WITH AN ACTUATOR OF A PARKING BRAKE

(75) Inventors: William Eugene Sherman, II, South Bend, IN (US); Ronald Joseph Ackerman, Bridgman, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/707,357

(22) Filed: Nov. 7, 2000

(51) Int. Cl.$^7$ ....................................................... F16D 51/06

(52) U.S. Cl. ........................................ 188/79.64; 188/325

(58) Field of Search .......................... 188/2 D, 78, 79.54, 188/79.64, 106 A, 325, 331; 74/500.5, 502.4, 502.6

(56) References Cited

U.S. PATENT DOCUMENTS

| | | | | |
|---|---|---|---|---|
| 4,887,698 | * | 12/1989 | Hunt et al. ............................ | 188/325 |
| 5,070,968 | * | 12/1991 | Evans ................................. | 188/79.64 |
| 5,180,037 | * | 1/1993 | Evans ................................. | 188/70 R |
| 5,322,145 | * | 6/1994 | Evans ................................. | 188/70 R |
| 5,360,086 | * | 11/1994 | Charmat ............................. | 188/79.54 |
| 5,720,367 | * | 2/1998 | Evans ................................. | 188/79.64 |

* cited by examiner

*Primary Examiner*—Christopher P. Schwartz
(74) *Attorney, Agent, or Firm*—Leo H McCormick, Jr.; Warren Comstock

(57) ABSTRACT

A parking brake having first and second brake shoes with a first end engaging an anchor post on a backing plate and a second end engaging an adjuster. An actuator located adjacent the anchor post has a first end that engages a first web on the first brake shoe and a second end the engages second web on the second brake shoe. A brake cable is connected to the actuator assembly for providing a force for moving the first and second brake shoes into engagement with the drum to effect a brake application. The actuator is characterized by a housing having first and second spaced apart walls with a first end and a second end. The first and second ends each have first and second ears with the first and second ears on the first end being joined together adjacent a central plane mid-way between the first and second side walls to establish a first slot that receives the first web. The first ears on said second end of the first and second walls are joined together adjacent the central plane while the second ear on the first side wall is located adjacent the central plane and the second ear of the second side wall is located in a plane parallel with the second side wall. The first and second ears on the second end establishing a second slot that receives the second web. A lever having a first end with a shoulder thereon and a second end with a hook thereon is pivotally located adjacent by a pin extending from the second ear on the first wall to the second ear on the second wall and bring the shoulder into engagement the second web. A spring located on the pin between the second end on the second side wall urging said first end of the lever into the central plane. A button located on the cable engages the second end of the lever such that the cable is located in the hook. An input force is applied to the second end of the lever by pulling on the cable to cause the shoulder to exert a force on the second web while a corresponding force is exerted on the first web through the first slot to move the first and second shoes into engagement with the drum to effect a brake application.

10 Claims, 2 Drawing Sheets

US 6,234,281 B1

ATTACHMENT OF A BRAKE CABLE WITH AN ACTUATOR OF A PARKING BRAKE

This invention relates to an actuator for a parking brake having structure for a attaching a brake cable to a lever therein.

BACKGROUND OF THE INVENTION

Many drum brakes include a parking brake lever which is activated by pulling on a cable to mechanically move first and second brake shoes into engagement with a drum to effect a brake application. Numerous mechanisms have been devised for attaching the cable to the end of the parking brake lever such as the ball retention structure disclosed in U.S. Pat. No. 5,142,935 and the resiliently positioned bushings as disclosed in U.S. Pat. No. 5,105,682 and 5,174,170. These connections function in an adequate manner under normal circumstances but with the use of four wheel disc brakes the drum-in-hat structure was introduced which limited the available space for components and as a result lever actuation such as disclosed in U.S. Pat. No. 5,180,037 was introduced. As disclosed in U.S. Pat. No. 5,180,037, the lever extends through the backing plate of the brake and the cable is attached by an eye member being located in a slot on the end of the lever. While this type of actuation is acceptable and functions in an adequate manner it is located on the outside of the brake structure where it is subjected to the elements. In order to make a more compact brake, the connection between the cable and actuator was located internally of the backing plate as disclosed in U.S. Pat. No. 5,311,793. The structure in U.S. Pat. No. 5,311,793 includes a spring clip which contracts to allow a button on the end of the cable to move past a fork legs on an actuation lever and later expands to prevent the button from moving out of engagement with the fork legs. An input force being applied by the cable to the fork legs to move the brake shoes into engagement with a drum to effect a brake application. In this structure, the spring clip is subjected to linear forces and after a period of time may suffer from fatigue or at least create noise.

SUMMARY OF THE INVENTION

A primary object of the present invention is to provide a connection for joining a cable with an actuator for a parking brake.

In more particular detail, the parking brake includes first and second brake shoes each having a first end that engages an anchor post on a backing plate and a second end that engages an adjuster. An actuator located adjacent the anchor post engages a first web on the first brake shoe and a second web on the second brake shoe. A brake cable connected to the actuator assembly provides a force for moving the first and second brake shoes into engagement with a drum to effect a brake application. The actuator is characterized by a housing having first and second spaced apart walls with a first end and a second end. The first and second ends of the first and second walls each have first and second ears. The first and second ears on the first ends are joined together adjacent a central plane mid-way between the first and second side walls to establish a first slot that receives the first web. The first ears on the second end of the first and second walls are joined together adjacent the central plane while the second ear on the first side wall is located adjacent the central plane but the second ear of the second side wall is located in a plane parallel with the second side wall. The first and second ears on the second end establishing a second slot that receives the second web. A lever having a first end with a shoulder thereon and a second end with a hook thereon is pivotally located on a pin that extends from the second ear on the first side wall to the second ear on the second side wall to position the shoulder in engagement the second web. A wave washer or spring located on the pin adjacent the second ear on the second side wall urges the first end of the lever into a position along the central plane. A button located on the cable and engaging the second end of the lever and with the cable being located in the hook provides an input force that is applied to the second end by pulling on the cable. The input force cause the lever to pivot on the pin and impart a force on the second web by way of the shoulder on the first end. At the same time, a corresponding force is exerted on the first web through the first and second side walls by way of the first slot. The input forces moves the first and second shoes into engagement with the drum to effect a brake application.

An advantage of the connection provided by the present invention resides in the wave washer which holds an actuation lever in a central plane through which an actuation force is applied to first and second webs on corresponding first and second brake shoes to effect a brake application.

A still further advantage of the present invention resides in the ease in which a button on a cable is connected to a hooked end on an lever of an actuator by pushing the button into a groove in a housing until the button moves past the hooked end and then pulling on the cable to position the button on a surface adjacent of the hooked end.

An object of this invention is to provide structure through which a cable is attached to a lever of an actuator by axially moving a lever as a button on the cable is inserted between the lever and a housing until the button moves past the lever and a spring repositions the lever along an a central plane such that on pulling on the cable the button now engages the end of the lever.

DETAILED DESCRIPTION

Figure 1:
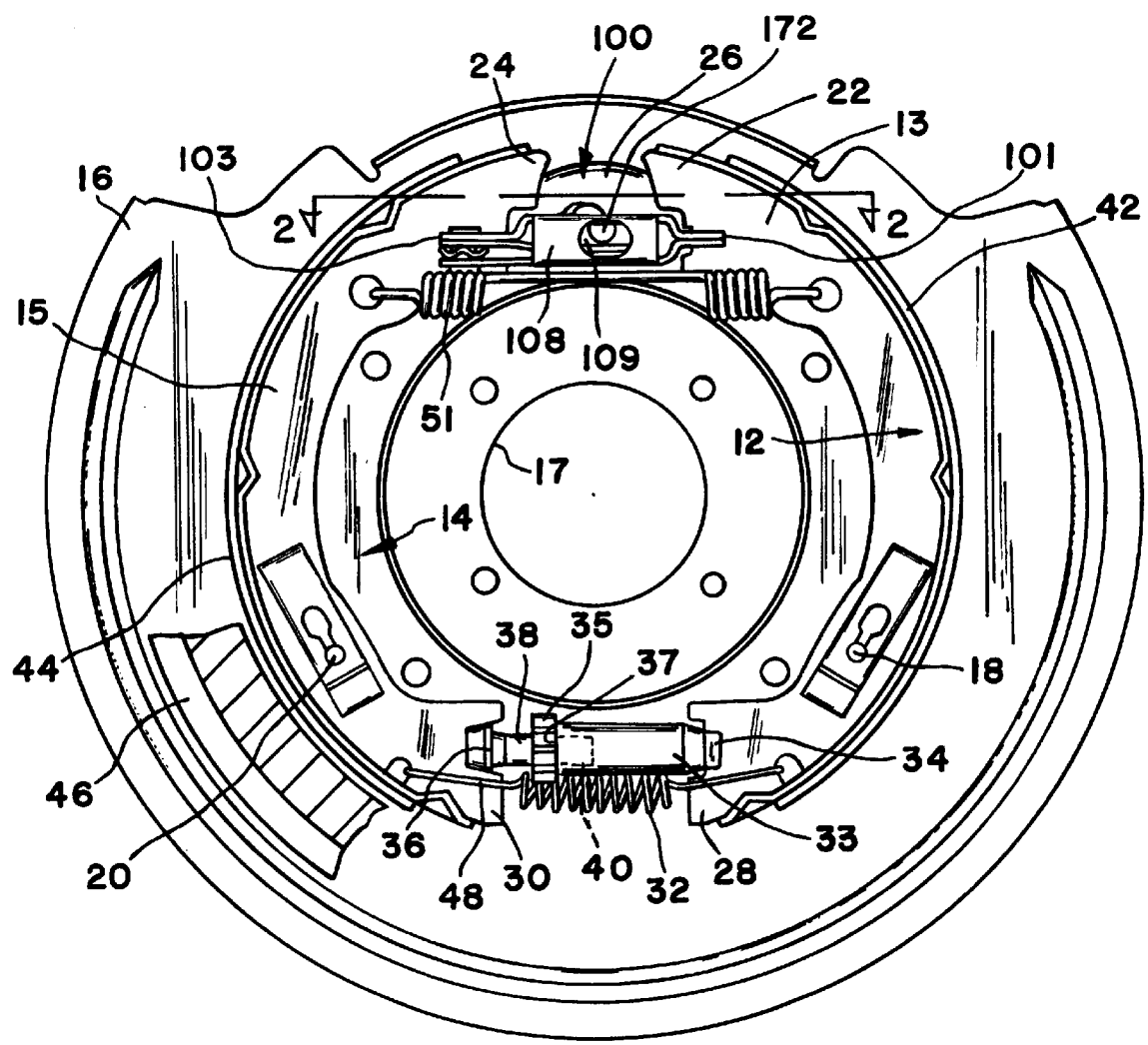
FIG. 1 is a schematic illustration of a parking brake for use in a brake assembly of a vehicle having an actuator made according to the principals of the invention.
Figure 2:
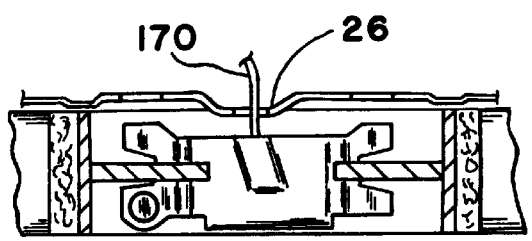
FIG. 2 is a view taken along line 2—2 of FIG. 1 showing the actuator of FIG. 1.
Figure 3:
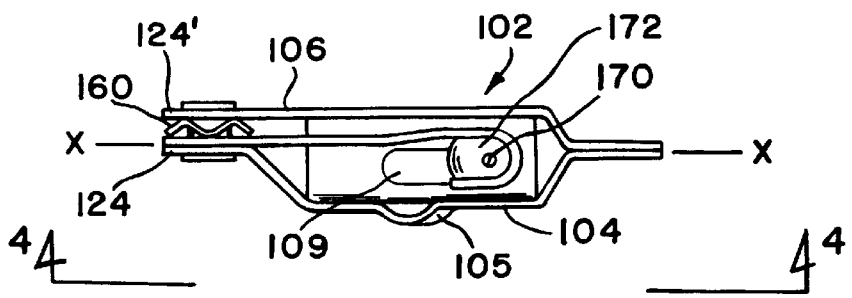
FIG. 3 is a view taken along line 3—3 of FIG. 2 showing the actuator of FIG. 1.
Figure 4:
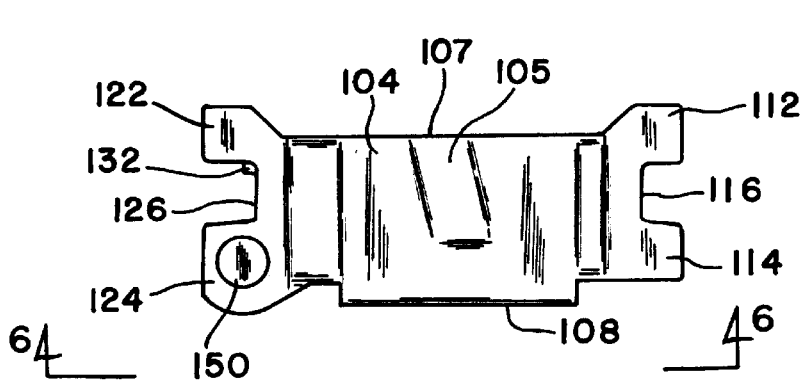
FIG. 4 is a view taken along line 4—4 of FIG. 3 showing the actuator of FIG. 1.
Figure 5:
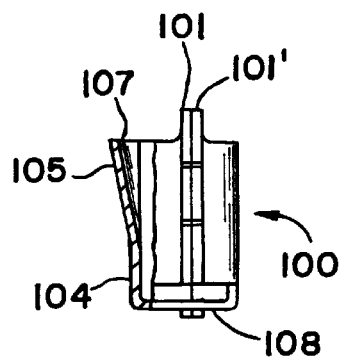
FIG. 5 is an end view of the actuator of FIG. 4 showing a partial sectional view of a semi-conical projection for guiding a button toward an alignment projection.
Figure 6:
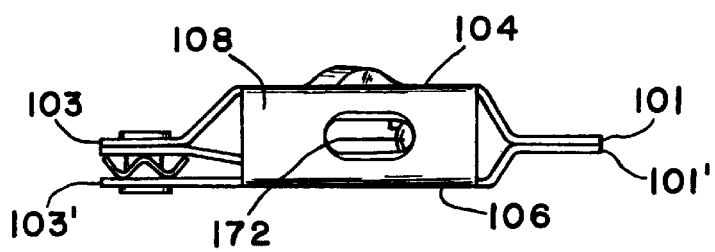
FIG. 6 is a view taken along line 6—6 of FIG. 4 showing the actuator of FIG. 1.

The parking brake 10 shown in FIG. 1 includes a backing plate 16 with an opening 17 for receiving an axle shaft of a vehicle. First 12 and second 14 brake shoes are retained on a backing plate 16 by first 18 and second 20 pins connected to a backing plate 16. Brake shoe 12 has a first end 22 and brake shoe 14 has a first end 24, respectively, contacting an anchor block 26. Further, brake shoe 12 has a second end 28 and brake shoes 14 has a second end 30, respectively, connected to an adjuster strut mechanism 32 of a type illustrated in U.S. Pat. Nos. 4,502,574 and 5,480,010. The adjuster strut mechanism 32 is respectively located between the webs 13 and 15 on brake shoes 12 and 14, to maintain a predetermined running clearance between first 42 and second 44 friction pads and a drum 46. A first spring 51 is connected to the first 12 and second 14 brake shoes for respectively urging the first ends 22,24 toward the anchor post 26 while a second spring 48 is connected to the first 12 and second 14 brake shoes for urging the second ends 28,30 toward the adjuster strut mechanism 32. An actuator 100 located adjacent the anchor post 26 has first 101 and second 103 ends that respectively engage webs 13,15 and in response to an input force provided by pulling on cable 170 acts on and respectively moves the first ends 22,24 on the first 12 and second 14 brake shoes outward to bring friction pads 42,44 into engagement with drum 46 to effect a first brake application during a parking brake application.

The adjustable strut mechanism 32 has a first end member 34 and a second end member 36 separated by a rotatable member 35. The first end member 34 receives web 13 on the first brake shoe 12 and the second end member 36 receives web 15 on the second brake shoe 14. A shaft 38 that extends from the second end member 36 is threaded and located in a bore 40 on the first end member 34. The rotatable member 35 is located on the threads on shaft 38 and engages the face 37 on the first end member 34. By rotating the rotatable member 35 on the shaft 38 the distance between the first 34 and second 36 ends can be adjusted and correspondingly change the space relationship between the friction pads 42 and 44 and the drum 46.

A actuator 100 is shown in more particular detail in FIGS. 2–8 and includes a housing 102 having first 104 and second 106 spaced apart side walls that extend from a base 108. The first 104 and second 106 side walls each having a first end 101,101' with first 112,112' and second 114,114' ears thereon which are joined together along a central plane "X-X" extending through the base 108 to define a first slot 116 there between. The first slot 116 is substantially perpendicular to the first 104 and second 106 side walls and receive the first web 13 on the first brake shoe 12. The first 104 and second 106 side walls each having a second end 103,103' with first 122,122' and second 124,124' ears thereon with the first ears 122,122' joined together along the central plane "X-X" and with the second ear 124 on the first side wall 104 being located in a same plane as the second ear 114 on the first end 101 of the first side wall 104 and the second ear 124' on the second side wall 106 being located in a plane substantially parallel with the second side wall 106. The first 122,122' and second 124,124' ears define a second slot 126 there between. The second slot 126 is substantially perpendicular to the first 104 and second 106 side walls and receiving the second web 15 on the second brake shoe 14. The first side wall 104 has a tapered semi-conical projection 105 that extends from the top 107 toward the base 108. Base 108 has an opening 109 therein which allows a button 172 on the end of cable 170 to move past the end 136 on lever 130 in a manner as later discussed.

Figure 7:
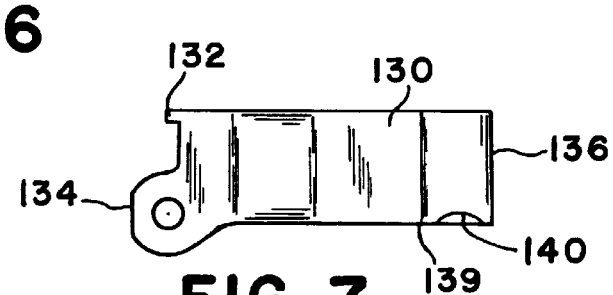
FIG. 7 is a side view of the lever in the actuator of FIG. 1.
Figure 8:
FIG. 8 is a top view of the lever in the actuator of FIG. 7.

Lever 130, as best shown in FIGS. 7 and 8, has a body with a rectangular shape having a shoulder 132 located between a first end 134 and a second end 136. The second end 136 has a hook 138 thereon with the center thereof being in alignment with the main body on the first end 134. Lever 130 has a small indentation or spherical surface 140 adjacent the second end 136 that receives button 172 on the end of cable 170.

A pin 150 is secured to the second ears 124,124' and extends through the lever 130 adjacent the first end 134 to pivotally retain the lever 130 between the first 104 and second 106 side walls and bring shoulder 132 into engagement with web 15 on the second brake shoe 14.

A wave washer 160 located on pin 150 adjacent the second ear 124' acts on the lever 130 to position the main body and first end 134 in the central plane "X-X" which is substantially equal distance from the first 104 and second 106 side walls. An input force applied to lever 130 causes lever 130 to pivot about pin 150 and impart a linear force to be applied to the web 13 through shoulder 132 and effect a parking brake application.

Method of Assembly

The brake cable 170 is connected with actuator 100 of a parking brake 10 through the following steps:

A first brake shoe 12 is attached to a backing plate 16 by a retention pin 18 and a second brake shoe 14 is attached to the backing plate 16 by a retention pin 20. An adjuster strut mechanism 32 placed between web 13 on the first brake shoe 12 and web 15 of the second brake shoe 14 and is held in place by a spring 48 attached webs 13,15. An actuator 100 is between the first 12 and second 14 brake shoes by locating web 13 in slot 116 and web 15 in slot 126. Spring 51 connected to webs 13,15 urges the first end 22 on brake shoe 12 and the first end 24 on brake shoe 14 toward anchor post 26 and webs 13,15 into respective engagement with the first 104 and second 106 side walls by way of slot 116 and shoulder 132. The actuator 100, which is located adjacent anchor post 26, is positioned with the tapered semi-conical projection 105 on the first side wall 104 being located in a top position and flat surface on the second side wall 104 located in a bottom position as shown in FIG. 1. In this position, the housing of the actuator 100 will not on interfere with spring 51. A button 172 on the end of cable 170 is blindly pushed through backing plate 16 into a space defined the first wall 104 and lever 130 of the actuator 1000. Button initially engaging the lever 130 and with further movement toward base 108 moves the lever 130 toward the second wall 106 by compressing wave washer 160. Movement of button 172 toward base 108 is guided by the tapered semi-spherical projection 105 toward the central plane "X-X" of actuator 100. Button 172 moves pasts the bottom surface 139 on hook 138 and may pass into hole 109 while cable 170 is aligned with the center of hook 138. When button 172 moves past the bottom surface 139 of hook 138, wave washer 160 acts on lever 130 to reposition the lever 130 along the central plane "X-X". Thereafter, a force is applied on cable 170 to pull button 172 into engagement with indentation 140 on hook 138 of lever 130. This completes the attachment of cable 170 with actuator 100.

Mode of Operation

When an operator desires to effect a parking brake application, an input force is applied by pulling on cable 170 causing lever 100 to pivot on pin 150 and imparting a force on web 15 of the second brake shoe 14 by way of shoulder 132 and at the same time a corresponding force is communicated to web 13 of the first brake shoe 12 by way of the engagement of the first slot 16 formed by the first end first 104 and second 106 side walls. This input force moves friction pads 42 and 44 on the first 12 and second 14 brake shoes into engagement drum 46 to effect a brake application.

We claim:

1. In a parking brake having a first brake shoe with a first end engaging an anchor post on a backing plate and a second end engaging an adjuster and a second brake shoe with a first end engaging said anchor post and a second end engaging said adjuster, an actuator being located adjacent said anchor post and engaging a first web on said first brake shoe and a second web on said second brake shoe, and a brake cable connected to said actuator assembly for providing a force for moving said first and second brake shoes into engagement with a drum to effect a brake application, said actuator being characterized by a housing having first and second side walls that extend from a base, said first and second side walls each having a first end with first and second ears thereon which are joined together along a central plane extending through said base to define a first slot there between, said first slot being substantially perpendicular to said first and second side walls for receiving a first web on said first brake shoe, said first and second side walls each having a second end with first and second ears thereon with the first ears joined together along said central plane and with said second ear on said first side wall being located in a same plane as said second ear on said first side wall with said second ear on said second side wall being substantially parallel with said second side wall, said first and second ears on said second end of said first and second walls define a second slot there between, said second slot being substantially perpendicular to said first and second side walls for receiving a second web on said second brake shoe, a lever having a shoulder located between a first end and a second end, a pin for pivotally locating said first end of said lever between said second ears on said second end of said first and second side walls such that said shoulder engages said second web on said second brake shoe, said lever having a hook thereon for receiving said cable to locate a button on said cable adjacent said second end of said lever, and resilient means located between said second ear on said second end of said second wall and said lever for maintaining said lever in said central plane such that an input force applied by movement of said second end of said lever by said cable is communicated through said shoulder into said second web to move said first and second brake shoes into engagement with said drum to effect a brake application.

2. The parking brake as recited in claim 1 wherein said resilient means is characterized as a wave washer for positioning said lever in a plane substantially equal distance between said first and second side walls.

3. The parking brake as recited in claim 2 wherein said first side wall has a semi-conical projection which guides said button toward said central plane.

4. The parking brake as recited in claim 3 wherein said resilient means yields to allow said button to move pass said hook into said central plane.

5. The parking brake as recited in claim 4 wherein said semi-conical projection on said first side wall is tapered with from a top surface toward said base.

6. The parking brake as recited in claim 5 wherein said lever engages said base while a portion of said button moves past said base for alignment with said central plane.

7. A method of assembling a brake cable with an actuator of a parking brake having a backing plate with a first brake shoe with a first end engaging an anchor post and a second end engaging an adjuster and a second brake shoe with a first end engaging said anchor post and a second end engaging said adjuster with an actuator being located adjacent said anchor post and engaging a first web on said first brake shoe and a second web on said second brake shoe comprising the steps of:

positioning a housing of said actuator defined by first and second spaced apart walls with a first end and a second end, said first and second ends each having first and second ears, said first and second ears on said first end being joined together adjacent a central plane mid-way between said first and second side walls to establish a first slot that receives said first web, said first ears on said second end of said first and second walls being joined together adjacent said central plane while said second ear on said first side wall is located adjacent said central plane and said second ear of said second side wall is located in a plane parallel with said second side wall, said first and second ears on said second end establishing a second slot that receives said second web, a lever having a first end with a shoulder thereon and a second end with a hook thereon, a pin extending from said second ear on said first wall to a said second ear on said first wall for pivotally locating said first end of said lever with said shoulder in engagement said second web, and a spring located on said pin between said second end on said second side for urging said first end of said lever to said central plane;

pushing a button on said cable into a space formed by said second end of said lever said first side wall causing said lever to move toward said second side wall by compressing said spring;

moving said button past said hook to allow said spring to reposition said lever along said central plane; and pulling said cable to engage said button with said second end of said lever with said cable located in said hook such that pulling on said cable causes said lever to pivot on said pin and transmit a force through said shoulder into said second web causing said first and second brake shoes to engage a drum and effect a brake application.

8. The method as recited in claim 7 further including the step of pushing said button includes locating said button in a groove in said first side wall to assist in guiding said button past said second end of said lever to a position where said cable is located in said hook.

9. In a parking brake having a first brake shoe with a first end engaging an anchor post on a backing plate and a second end engaging an adjuster and a second brake shoe with a first end engaging said anchor post and a second end engaging said adjuster, an actuator being located adjacent said anchor post and engaging a first web on said first brake shoe and a second web on said second brake shoe, and a brake cable connected to said actuator assembly for providing a force for moving said first and second brake shoes into engagement with a drum to effect a brake application, said actuator being characterized by a housing having first and second spaced apart walls with a first end and a second end, said first and second ends of said first and second wall each have first and second ears, said first and second ears on said first end being joined together adjacent a central plane mid-way between said first and second side walls to establish a first slot that receives said first web, said first ears on said second end of said first and second walls being joined together adjacent said central plane while said second ear on said first side wall is located adjacent said central plane and said second ear of said second side wall is located in a plane parallel with said second side wall, said first and second ears on said second end establishing a second slot that receives said second web, a lever having a first end with a shoulder thereon and a second end with a hook thereon, a pin extends from said second ear on said first side wall to a said second ear on said second side wall for pivotally locating said first end of said lever with said shoulder in engagement said second web, and a spring located on said pin adjacent said second ear on said second side wall urges said first end of said lever into said central plane, a button located on said cable and engaging said second end of said lever with said cable being located in said hook such that an input force applied to said second end by pulling on said cable causes said shoulder to exert a force on said second web and a corresponding force is exerted on said first web through said first slot to move said first and second shoes into engagement with said drum to effect a brake application.

10. The parking brake as recited in claim 9 wherein said first side wall includes a groove to assist in initially locating said cable in said hook as said button is positioned adjacent said second end.

* * * * *